United States Patent [19]

Malard

[11] 4,252,577

[45] Feb. 24, 1981

[54] METHOD AND APPARATUS FOR TREATING METAL SCRAP CUTTINGS

[75] Inventor: Jacques Malard, Fontenay aux Roses, France

[73] Assignee: Regie Nationale des Usines Renault, Boulogne-Billancourt, France

[21] Appl. No.: 972,295

[22] Filed: Dec. 22, 1978

[30] Foreign Application Priority Data

Dec. 22, 1977 [FR] France .................................. 77 38880

[51] Int. Cl.$^3$ .......................... B22F 1/00; B02C 11/08; B02C 23/08; B02C 23/02
[52] U.S. Cl. ...................................... 148/126; 75/211; 75/213; 29/403.1; 241/23; 241/24; 241/47; 241/65; 241/68; 241/82.1
[58] Field of Search .................. 75/211, 213; 148/126; 29/403; 241/23, 82.1, 68, 65, 47, 24, DIG. 14, 37

[56] References Cited

U.S. PATENT DOCUMENTS

| | | | |
|---|---|---|---|
| 3,885,744 | 5/1975 | Drage | 241/23 |
| 4,015,780 | 4/1977 | Hall | 241/23 |
| 4,018,633 | 4/1977 | Holland | 148/126 |
| 4,043,019 | 8/1977 | Schröder | 241/23 |
| 4,090,874 | 5/1978 | Kaufman | 75/213 |
| 4,129,443 | 12/1978 | Kaufman | 75/21 |

Primary Examiner—Brooks H. Hunt
Attorney, Agent, or Firm—Beveridge, DeGrandi, Kline & Lunsford

[57] ABSTRACT

Metal scrap cuttings are prepared for use in making sintered pieces. The cuttings are physically and chemically cleaned, ground in an inert atmosphere, heat treated in a reducing atmosphere, and sorted according to particle size in an inert atmosphere. Movement of the cuttings into the various treatments is performed by vibratory conveyors located in enclosures sealed from the atmosphere.

24 Claims, 1 Drawing Figure

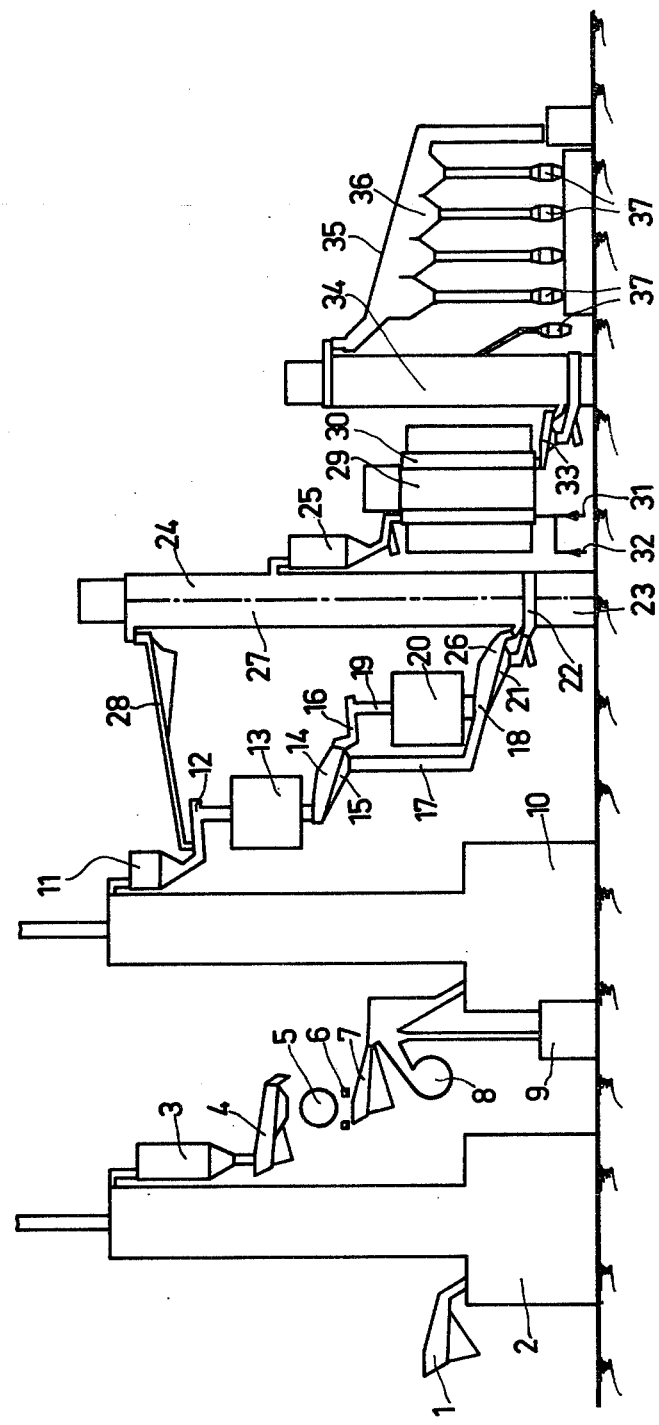

METHOD AND APPARATUS FOR TREATING METAL SCRAP CUTTINGS

BACKGROUND OF THE INVENTION

This invention relates to a method and apparatus for treating metal scrap cuttings and more particularly for preparing such cuttings for use in a powdery metal material, suitable for making sintered pieces.

The metal scrap cuttings used in this invention are scraps from machine tools which perform various well-known machining steps in the manufacture of parts for mechanical devices.

Heretofore these metal scraps have been a nuisance in that they present problems of storage, handling and rapid oxidation.

Despite their availability and generally small size, no proposal known to applicant has been made to use these scraps in preparation of metal powders intended for making sintered pieces in powder metallurgy processes. Conventionally, such metal powders are prepared by treatment of a molten metal material.

Raw metal scrap cuttings are not suitable for use in powder metallurgy processes because their abrasive physical state poses problems of handling, the cuttings having a tendency to wear the parts of the handling devices. Another problem arises from the cold working of these cuttings. When making sintered pieces from metallic powders, the presence of cold worked constituents in the powder can impede sintering.

Untreated machine tool cuttings, moreover, have a tendency particularly when heated, to form agglomerated masses unsuitable for making sintered pieces.

SUMMARY OF THE INVENTION

The applicant has now discovered a method and apparatus for preparing and using metal scrap cuttings in powder metallurgy processes for making sintered pieces.

The method of and apparatus for treating metal scrap cuttings according to the invention includes the steps of and means for chemically and physically cleaning the cuttings, grinding the cuttings in an inert atmosphere, heat treating the cuttings in a reducing atmosphere, and sorting the cuttings by particle size in an inert atmosphere. Preferably the material is moved into the various stages by vibratory devices which are located in enclosures sealed from the atmosphere.

Chemical and physical cleaning is preferably performed by a series of steps and means which degrease the cuttings, screen the cuttings, magnetically separate the cuttings from nonferrous elements, demagnetize the cuttings to eliminate any remanence, and again degrease the cuttings. The movement of the cuttings during the various stages is performed by vibrating devices such as vibratory conveyors.

The vibrating devices include vibrating distributors which extract the cuttings from the degreasing bath and move them through a drying zone enroute to a stage where they are screened by a vibrating screen. The vibrating devices and particularly the vibrating lifts are made so as to avoid agglomeration of the cuttings and to promote a continual mixing of the cuttings to obtain a good contact of the cuttings with the degreasing agent while in the bath and prior to their drying.

In a particularly advantageous embodiment, the degreasing is performed by the action of a cleaning agent which is agitated against the cuttings by ultrasonic vibrations delivered by a transducer to the degreasing bath. A preferred cleaning agent is trichloroethylene.

The degreasing stage takes place at a temperature above the ambient temperature, preferably at about 60° C. The cuttings subjected to the action of the degreasing agent are cooled to a temperature less than the degreasing bath temperature and greater than ambient temperature, preferably around 40° C. When cooled, the cuttings are dried in the vibrating lift by an air current at a temperature between about 80° and 150° C., and preferably at about 120° C. sent under the vibrating lift. The air-heated cuttings are cooled at the top of the treatment tower at a temperature sufficient to trap the various vapors emitted during heating, preferably around 40° C.

This physical and chemical cleaning stage may be followed by a separator which blows high pressure air across a falling certain of cuttings to eliminate the ungrindably coarse parts such as nuts and bolts.

A second degreasing stage of similar construction and operation may be connected to the outfeed end of the first degreasing stage.

The inert atmosphere in which grinding takes place may be made up of nitrogen or a rare gas. According to a particularly advantageous embodiment of the invention, the cuttings are bathed in liquid nitrogen prior to the grinding stage in order to make them brittle, and the vapor of the liquid nitrogen provides the inert atmosphere. The entire process is carried out in enclosures sealed from the atmosphere.

Grinding is performed by mills, preferably hammer mills. Movement into and out of the grinding stage is produced by vibrating distributors which bring the degreased cuttings into the mill and take the ground cuttings to a screening stage which includes a vibrating screen. The vibrating screen separates larger insufficiently ground cuttings from the smaller sufficiently ground cuttings. The separated larger cuttings are recycled and milled again, while the proper sized cuttings are moved to the heat treatment stage.

The heat treatment is intended to anneal the cuttings to eliminate all traces of cold working. Heat treatment is preferably performed in a helical vibrating device of refractory material. This vibrating device is preferably equipped with two vibrators which cause the cuttings to circulate. Exemplary helical vibrating devices are shown in Jones et al U.S. Pat. No. Re. 24, 281 and Ginther U.S. Pat. No. 2,688,807, both of which are incorporated herein by reference. This device is located in an oven preferably having three heating zones and three regulating zones, providing a temperature between about 500° and 800° C., preferably about 700° C. The cuttings remain in the oven between five and twenty minutes, preferably about ten minutes.

The reducing atmosphere is created in a preferred embodiment of the invention by a mixture of an inert gas such as nitrogen with a reducing gas such as hydrogen. The inert gas delivery is preferably between 5 and 10 m$^3$/h, while the reducing gas delivery is preferably between 0.75 and 1.5 m$^3$/h. These gases flow countercurrently to the cuttings in the vibrating device.

After heat treatment is complete the cuttings are moved by a vibrating screen to a sorting unit in an inert atmosphere, while the agglomerated cuttings are rejected.

As indicated above, the process and apparatus isolate the cuttings from the atmosphere. This prevents any oxidation by air or atmospheric elements.

Exemplary helical vibrating devices are shown in Jones et al U.S. Pat. No. Re. 24,281, Ginther U.S. Pat. No. 2,688,807, and White U.S. Pat. No. 3,207,293, all of which are incorporated herein by reference.

BRIEF DESCRIPTION OF THE DRAWING

The drawing shows, in schematic form, an installation for transforming metal scrap cuttings into suitable constituents of powders for making sintered pieces.

DETAILED DESCRIPTION OF THE PREFERRED EMBODIMENT

The cuttings resulting from machining pieces of metal are loaded into a vibrating distributor 1 which feeds a washing tower 2. The cuttings may be conveyed by a conventional skip to the vibrating distributor 1. For instance, the contents of a cutting skip can be dumped into a receiving hopper, carried by an elevating conveyor into a batch centrifuge and fed from the centrifuge by a pickup conveyor which leads to the vibrating distributor 1. This avoids unnecessary handling which has numerous drawbacks, as indicated above.

The cuttings are introduced into washing tower 2 where they are immersed in a bath of a cleaning agent such as trichloroethylene heated to a temperature of about 60° C. and subjected to ultrasonic vibrations. The cuttings are removed from the bath by a vibrating lift. They are cooled to about 40° C. on leaving the bath by cold water coils. The cooled cuttings are then dried in the upper part of the tower by hot air coming from an air pipe placed under the windings of the vibrating lift. The air should preferably be at a temperature of about 120° C.

It should be noted that use of the vibrating lift during this degreasing process avoids agglomeration of the cuttings and causes a continual mixing that promotes contact with the degreasing agent. The degreased cuttings are introduced from the top of the washing tower 2 into a distribution hopper 3 associated with a vibrating screen 4 which eliminates parts that are ungrindably coarse. After screening in screening device 4 the cuttings may optionally be passed through magnetic device 5 to remove nonferrous constituents from the cuttings and then through demagnetizer 6 to eliminate the remanence of the cuttings.

The cuttings continue the movement, going through a separator 7 in which a high-pressure air blower 8 eliminates ungrindably coarse parts such as nuts, bolts, etc. from the lighter cuttings. The coarse parts fall into box 9 while the sorted cuttings are carried by the air stream into a second washing tower 10 which is similar in construction and operation to tower 2.

The degreased cuttings are conveyed from the top of tower 10 into a cutting distribution hopper 11 associated with a vibrating distributor 12 where liquid nitrogen is introduced to make the cuttings brittle before grinding. The liquid nitrogen present in this stage of the operation also provides the inert atmosphere for the grinding of the cuttings.

The cooled cuttings are introduced into a mill 13 which typically may be a rod or hammer mill. The ground cuttings are taken by a distributor and screen 14 which separates the cuttings and sends sufficiently ground cuttings to 15 and insufficiently ground cuttings to 16. The sufficiently ground cuttings are transferred by column 17 to a vibrating chute 18. The insufficiently ground cuttings are introduced into a vibrating distributor 19 that can receive liquid nitrogen as above to make the cuttings brittle before they enter a second grinding in a hammer or rod mill 20. The reground cuttings are dispensed into vibrating chute 18. A screening device 21 associated with chute 18 separates the ground cuttings into two groups. Sufficiently ground cuttings are ready for the heat treatment and are carried by 22 to a coil 23 in vibrating tower 24 to a storage hopper 25. The insufficiently ground cuttings are conveyed from 26 to a coil 27 in the vibrating tower 24 where they ascend to a vibrating chute 28 located at the top of tower 24. Chute 28 conveys said cuttings into vibrating distributor 12 for regrinding.

The sufficiently ground cuttings are stored in a storage hopper 25, from which they are introduced into a vibrating feeder 29, equipped with a helical vibrating chute of refractory stainless steel equipped with two vibrators. This chute further includes a fluid-tight bell of refractory stainless steel with an expansion joint and a heat screen in the upper part to protect the vibratory unit. An electric resistance oven 30 provides three heating zones and three regulating zones. Such an oven has, for example, a power of 30 kw and the temperature of about 700° C. The cuttings preferably stay in this heat treatment zone about 10 minutes. A reducing atmosphere is introduced into this vibrating chute by conduits 31 and 32 which are connected to hydrogen and nitrogen sources respectively. The device can be equipped with a flare, not shown, to assure the combustion of surplus hydrogen.

After the heat treatment, the cuttings move over a stainless steel vibrating screen 33 that passes sufficiently fine cuttings and conveys them to a vibrating tower 34 which transfers the cuttings to a sorting unit 35. Any agglomerated cuttings are removed by screen 33.

Sorting unit 35 includes a vibrating screen 36 which sorts the cuttings into four categories by particle size. The different sized cuttings are collected in containers 37 which hold them in an inert atmosphere. Double valves may be provided for containers 37 so that the transformed cuttings may be removed from the system without destroying the integrity of the gas-tight seal of the installation.

The cuttings may be stored as they are or they may be premixed before storage with the usual ingredients used in powder metallurgy technology. Premixing may be performed by a mixing device having a steel buffer hopper with an extractor-vibrator, a stainless steel zinc stearate storage hopper equipped with an adjustable extractor-vibrator, or a stainless steel graphite storage hopper equipped with an adjustable extractor-vibrator. Mixing may be performed in a weighing hopper with a gauge scale, all in a nitrogen atmosphere. In this way a powder mixture may be obtained ready to be used for making sintered pieces.

Persons familiar with the mechanical and metallurgical arts will realize that the invention may take a variety of forms other than the preferred embodiment described above. It is intended that the invention encompass such variants, so it is herein emphasized that the invention is not limited solely to the disclosed embodiment but is embracing of a wide variety of methods and apparatuses which fall within the spirit of the following claims.

The elements 1, 4, 12, 14, 18, 19, 21, 24, 28, 29, 33, 34, 36 as well as the vibrating lift which move the cuttings into, through and from the processing steps where washing, distribution, separation, milling, heat-treating and sorting are performed, all include a cuttings support surface, an enclosure which seals and protects the cuttings on the support surface from the ambient atmosphere and means for vibrating the cuttings support surface to move the cuttings and cause their continual mixing, the elimination of the coarse parts and the sorting of the particles.

I claim:

1. A process for treating metal scrap cuttings comprising the steps of:
   (a) degreasing said cuttings to provide degreased cuttings which have their surfaces unprotected from exposure to their environment,
   (b) grinding said cuttings,
   (c) heat treating said ground cuttings to relieve any cold working in the cuttings, said heat treating step being performed in a reducing atmosphere to prevent oxidation of the cuttings being treated,
   (d) said cuttings being advanced during the process by vibratory movement which mixes and moves the cuttings without manual contact, said vibratory movement preventing agglomeration of the cuttings and providing good contact between the cuttings and their environment, and
   (e) continuously isolating the degreased cuttings from the atmosphere and any oxidation-producing atmospheric elements.

2. A process according to claim 1 including the step of removing ungrindably coarse particles from the cuttings prior to said grinding step.

3. A process according to claim 2 including the step of sorting the ground cuttings into groups according to size in an inert atmosphere.

4. A process according to claim 1 including the steps of producing said cuttings by machining pieces of metal to produce machined articles and a residue of metal scrap in the form of cuttings, and making sintered pieces from a powdery metal material which includes said annealed cuttings.

5. A process according to claim 1 including the step of magnetically separating ferrous cuttings from nonferrous elements therein.

6. A process according to claim 1 including the steps of bathing said cuttings in liquid nitrogen prior to said grinding step in order to make said cuttings brittle, and using the vapors of said liquid nitrogen to provide an inert atmosphere for said grinding step.

7. A process according to claim 1 wherein said heat treating step is performed by heating said ground cuttings in a helical vibrating device of refractory material in an oven having three heating zones at a temperature between about 500° and 800° C.

8. A process according to claim 1 wherein said reducing atmosphere of said heat treating step is a mixture of nitrogen and hydrogen gases flowing concurrently to the cuttings.

9. A process according to claim 8 wherein said heat treating step is performed by heating said ground cuttings in a helical vibrating device of refractory material in an oven having three heating zones at a temperature between about 500° and 800° C.

10. A process according to claim 1 wherein said degreasing step is performed by immersing said cuttings in a bath of cleaning agent, and subjecting said bath of cleaning agent and said cuttings to ultrasonic vibrations.

11. A process according to claim 10 including the steps of bathing said cuttings in liquid nitrogen prior to said grinding step in order to make said cuttings brittle, and using the vapors of said liquid nitrogen to provide an inert atmosphere for said grinding step.

12. A process according to claim 11 wherein said heat treating step is performed by heating said ground cuttings in a helical vibrating device of refractory material in an oven having three heating zones at a temperature between about 500° and 800° C.

13. Apparatus for treating metal scrap cuttings comprising:
   (a) means for degreasing said cuttings to provide degreased cuttings which have their surfaces unprotected from exposure to their environment,
   (b) means for grinding said cuttings,
   (c) means for heat treating said ground cuttings to relieve any cold working in the cuttings, said heat treating means providing a reducing atmosphere to prevent oxidation of the cuttings being treated,
   (d) means for advancing said cuttings during the process by vibratory movement which mixes and moves the cuttings without manual contact, said advancing means providing vibratory movement to prevent agglomeration of the cuttings and to provide good contact between the cuttings and their environment, and
   (e) means for continuously isolating the degreased cuttings from the atmosphere and any oxidation-producing atmospheric elements.

14. The apparatus according to claim 13 including means for removing ungrindably coarse particles from the cuttings prior to said grinding step.

15. The apparatus according to claim 14 including means for sorting the ground cuttings into groups according to size in an inert atmosphere.

16. The apparatus according to claim 13 including means for producing said cuttings by machining pieces of metal to produce machined articles and a residue of metal scrap in the form of cuttings, and making sintered pieces from a powdery metal material which includes said annealed cuttings.

17. The apparatus according to claim 13 including means for magnetically separating ferrous cuttings from nonferrous elements therein.

18. The apparatus according to claim 13 including means for bathing said cuttings in liquid nitrogen prior to said grinding step in order to make said cuttings brittle, the vapors of said liquid nitrogen providing an inert atmosphere in said grinding means.

19. The apparatus according to claim 13 wherein said heat treating means including a helical vibrating device of refractory material, an oven enclosing said helical vibrating device and having three heating zones at a temperature between about 500° and 800° C.

20. The apparatus according to claim 13 wherein said heat treating means including means for providing a reducing atmosphere which is a mixture of nitrogen and hydrogen gases flowing concurrently to the cuttings.

21. The apparatus according to claim 20 wherein said heat treating means includes a helical vibrating device of refractory material, an oven enclosing said helical vibrating device and having three heating zones at a temperature between about 500° and 800° C.

22. The apparatus according to claim 13 wherein said degreasing means includes means for immersing said cuttings in a bath of cleaning agent, and means for subjecting said bath of cleaning agent and said cuttings to ultrasonic vibrations.

23. The apparatus according to claim 22 including means for bathing said cuttings in liquid nitrogen prior to said grinding step in order to make said cuttings brittle, the vapors of said liquid nitrogen providing an inert atmosphere in said grinding means.

24. The apparatus according to claim 23 wherein said heat treating means includes a helical vibrating device of refractory material, an oven enclosing said helical vibrating device and having three heating zones at a temperature between about 500° and 800° C.

* * * * *